United States Patent [19]

Brooks

[11] 4,309,204
[45] Jan. 5, 1982

[54] PROCESS AND APPARATUS FOR REMELTING SCRAP GLASS

[75] Inventor: Robert Brooks, Columbus, Ohio

[73] Assignee: Owens-Corning Fiberglas Corporation, Toledo, Ohio

[21] Appl. No.: 95,197

[22] Filed: Nov. 19, 1979

[51] Int. Cl.³ .................... C03B 5/225; C03B 3/00
[52] U.S. Cl. ........................... 65/28; 65/134; 65/137; 65/335
[58] Field of Search ........... 165/28, 121, 134, 135, 165/137, 335, 165

[56] References Cited

U.S. PATENT DOCUMENTS

| | | | |
|---|---|---|---|
| 3,343,935 | 9/1967 | Keefer et al. | 65/121 |
| 3,466,160 | 9/1969 | Keefer | 65/157 |
| 3,647,405 | 5/1972 | Smith | 65/181 |
| 4,054,434 | 10/1977 | Thomas et al. | 65/134 |
| 4,065,282 | 12/1977 | Morey | 65/62 |
| 4,133,666 | 1/1979 | Rhodes | 65/121 |
| 4,185,984 | 1/1980 | Kiyonaga | 65/135 |

FOREIGN PATENT DOCUMENTS 610800  6/1978  U.S.S.R. ........................ 65/135

*Primary Examiner*—Michael S. Marcus
*Attorney, Agent, or Firm*—Ronald C. Hudgens; Patrick P. Pacella

[57] ABSTRACT

A process and apparatus for remelting scrap glass fibers is disclosed. The removal of binder and remelting of the scrap are carried out in one operation, and the resulting molten scrap fibers are fed directly into a conventional glass melting furnace. Granular raw glass batch also is fed into the glass melting furnace.

7 Claims, 2 Drawing Figures

PROCESS AND APPARATUS FOR REMELTING SCRAP GLASS

TECHNICAL FIELD

This invention relates to a process and apparatus for melting glass which includes the remelting of scrap glass.

BACKGROUND ART

Before remelting scrap glass, organic binders and sizes on the surface of the glass must be removed. If this is not done, the glass will enclose the remaining binder in the form of carbon. Upon melting, carbon will reduce the glass. This reduced darkened glass is undesirable for both glass composition and melting.

One method of doing this is to mill the scrap glass and blend it with granular raw batch before charging the batch to the furnace. It is important to ensure that oxidizing conditions are maintained in the glass melt within the furnace so that the glass furnace may feed a fiberizing process without harmful effects.

This process has many inherent disadvantages. For example, the scrap glass must be passed through a shredding operation and stored in a silo before blending with conventional granular batch. Further, the process demands that an entire glass furnace be kept at oxidizing conditions to ensure that carbonaceous material is removed.

DISCLOSURE OF INVENTION

I have developed a process that provides for remelting scrap glass that includes the steps of removing binders or sizes from the scrap glass, remelting the scrap glass and feeding the molten scrap directly into a furnace which feeds a fiberizing process. Binder removal and melting of the scrap glass are carried out in a separate scrap remelt furnace. The molten scrap glass is fed directly into a furnace independently of conventional batch feeding. The scrap recycle furnace provides a method of remelting scrap glass with minimal modification to a conventional process for melting glass. The remelting furnace removes organic binder and remelts the scrap in one operation with little or no handling of the scrap prior to melting.

BEST MODE OF CARRYING OUT INVENTION

Figure 1:
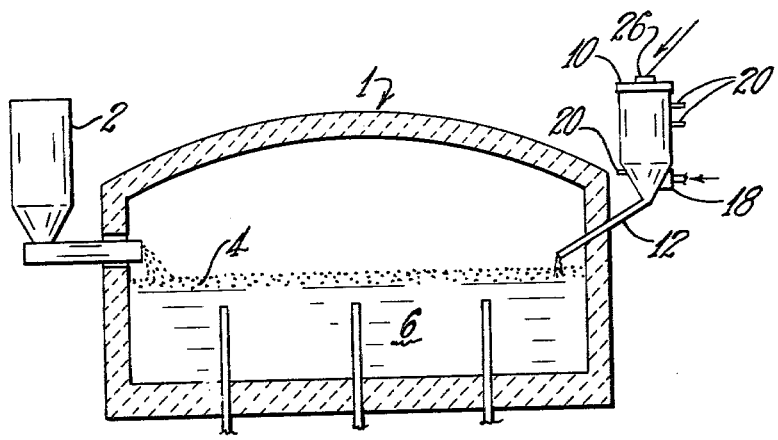
FIG. 1 illustrates a cross section of a conventional glass melting furnace being fed by a conventional batch feeder and the scrap melter of this invention.

FIG. 1 is a cross section of a conventional textile furnace 1 constructed generally of refractory blocks, so as to include a conventional batch feeder 2. The batch forms a blanket 4 floating on the surface of molten glass 6.

Scrap melter 10 is connected to furnace 1 by molten scrap exit tube 12. The scrap melter should be connected to the furnace above the glass or batch line. FIG. 1 shows tube 12 connected to the top of furnace 1. Scrap melter 10 includes furnace exhaust port 14, scrap feeder 16, burners 18, and a compressed air injection box 26.

Figure 2:
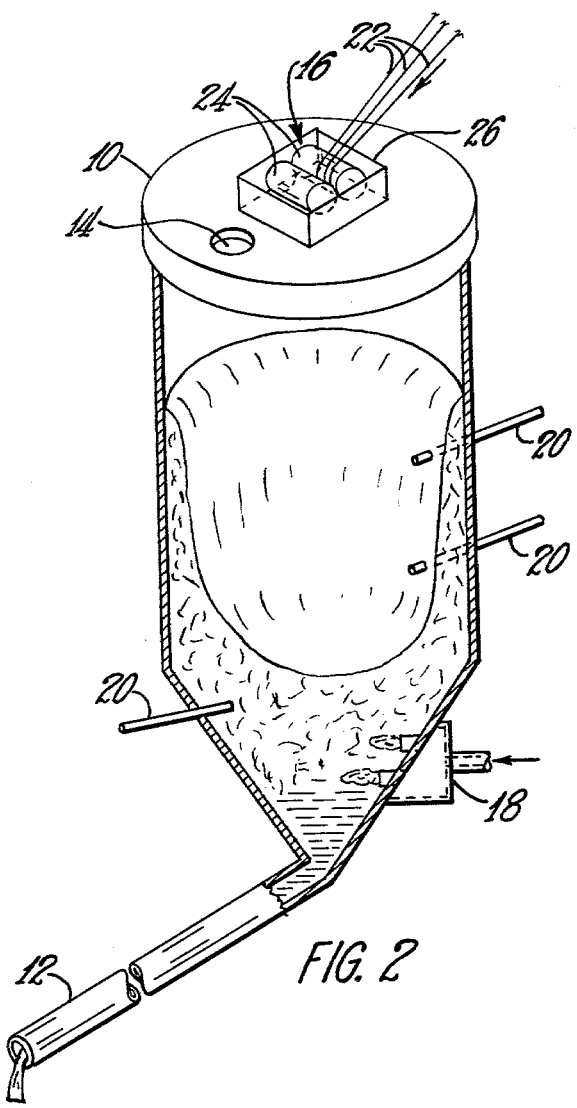
FIG. 2 illustrates the scrap remelt furnace of this invention in greater detail.

FIG. 2 illustrates scrap melter 10 more fully and includes thermocouples 20. Glass feeder 16 is shown in more detail feeding glass strands 22 to melter 10 through rotating shaft feeders 24. Molten scrap exit tube 12 is not shown in FIG. 2.

There are several versions of a vertical scrap melter that are commercially available. Each unit has the same basic design with a firing system. Units are vertical shaft furnaces with gas-fired burners located near the bottom. In accordance with this invention, a temperature gradient is maintained between the top and bottom of the furnace. Scrap fibers were fed into the top of the melter. The top temperature of the furnace is maintained at a temperature lower than the glass melting temperature which pyrolizes the organic binder but does not melt the glass. As glass fibers move toward the furnace bottom they melt and drain out of the furnace. The furnace is operated in an oxidizing state to ensure complete combustion of the organic binder.

The furnace exhaust is partially covered to control hot gases exiting the top. This is done to control the binder removal and rate of glass heat up.

I have found that a temperature gradient up to 600° F. from top to bottom is preferred for proper operation. For scrap "E" glass fibers, the hot burner section temperature should be maintained at 2500° F. and the exit port temperature should be 2200° F. to maintain proper flow out of the furnace at a prescribed pull rate.

Upon leaving the remelt unit, the glass is foamy and inhomogeneous. Therefore it needs to be refined in the production furnace. Physical properties of the remelted glass are the same as those of production glass. Viscosity, liquidus and refractive index are equal. Compositional check of the glass also shows that it is the same as production glass. This means that very little or none of the fiber's constituents are volatilized and glass carbon content is insignificant. The highest carbon measured was 0.03 percent by weight.

Two fiber feeding systems were tested on the laboratory operating scrap remelt furnace. They were a ram charging unit and a rotary feed unit. The ram charging unit works by pushing scrap into the top of the remelt furnace. A metal flap is used to prevent venting of hot gases through the ram charger. With fibers being pushed into the remelt furnace, there exists a large potential for abrasive wear. Except for the abrasion, the ram charger operated satisfactorily feeding the remelt furnace.

The rotating shaft feeder, as shown in FIG. 2, has two shafts that sit above a rectangular hole at the top of the remelt furnace. A variable speed motor is attached by chain to the shafts. The shafts rotate such that they pull fibers between them and inject the fibers into the furnace. Below the rotating shaft feeder is a stainless steel air injection box. This device has compressed air blown into it. The air is then blown out of the box into the rectangular hole below the feeder. Air from the box lowers the temperature at the feeding hole. The air also lowers the top temperature of the scrap furnace. The feeder was designed to move critical moving parts out of the heat.

I have found that scrap remelted glass preferably may contribute 5 to 50 percent by weight of the total glass batch in the production furnace, preferably 5 to 25 percent.

The scrap remelt furnace will be connected to the production furnace via an electrically heated platinum lined tube. The tube will be heated by the exhaust combustion gases from the remelt furnace and can also be heated by electrical wires which surround it. In some instances, however, it may not be necessary to employ platinum or electrical heating. An unheated ceramic or platinum tube may be employed.

The scrap melter was connected to a production textile tank opposite the batch feeder near the rear wall of the furnace (see FIG. 1). Glass contact zircon refractory will be used to line the lower section of the melter. The upper section lining and burner blocks will be TZB refractory. The exit port of the scrap melter is also lined with zircon. Fibers will be injected into the unit near the top as shown. The furnace will be operated continuously since cycling temperature can thermally shock the zircon refractory. A movable cap is placed over the exhaust port to control top temperatures and exhaust gas flow.

INDUSTRIAL APPLICABILITY

The vertical melting furnace can remove organic binder and remelt scrap textile fibers in one operation. For "E" glass scrap fibers, burner temperature should be 2500° F. with sufficient internal pressure to keep the exit port at 2200° F. Keeping the furnace gradient such that the top is up to 600° F. lower than the burner temperature allows binder burn off before glass melting. Glass samples from the scrap furnace result in 0.01 to 0.03 weight percent of carbon which is insignificant.

Glass physical properties of remelted scrap are the same as those of production glass.

Viscosity Log 2.5=2360° F.
Liquidus Temperature=2110° F.
Refractive Index=1.558

Since scrap remelted glass composition is basically the same as production glass, remelting is obviously occurring at temperatures lower than those of a production furnace which reduces volatilization of components. Pull rate for the unit was 100 pounds per hour. Larger pull rates can be achieved by increasing furnace operating temperatures.

The positioning of the scrap feed point should be as near the rear of the glass melting furnace as possible, and that the scrap throughput into the furnace preferably should be 15 percent. A rotating shaft feeder with a variable speed motor works well in supplying fiber to the remelt furnace. The unit can withstand temperatures associated with feeding the remelt furnace. It can be adjusted to feed varying amounts of fibers and has minimal abrasion contact with the fibers. The physical connection between the remelt furnace and the production furnace should be an electrically heated platinum lined tube. Melted fibers and hot combustion gases travel through the tube and are injected into the production furnace.

I claim:

1. A process for recycling scrap glass including the steps of:
   feeding scrap glass to a scrap glass melting furnace;
   maintaining oxidizing conditions within the scrap furnace so as to burn-off organic binders or sizes;
   converting the scrap glass to a molten glass; and
   feeding the molten glass to a glass melting furnace which is also being fed granular raw glass batch, including the step of maintaining a temperature gradient between the top and bottom of the scrap furnace wherein the top of the scrap melter is up to 600° F. cooler than the bottom.

2. A process according to claim 1 where the granular raw glass batch is fed in agglomerated form.

3. A process according to claim 1 wherein the molten scrap glass is 5 to 50% by weight of the total glass batch being fed to the glass melting furnace.

4. A process according to claim 3 wherein percent by weight of molten scrap glass ranges from 5 to 25.

5. A process according to claim 1 wherein the scrap glass is fed into the top of the scrap melter in the form of scrap glass fibers;
   wherein the temperature pyrolizes any organic binder or size but does not melt the scrap glass;
   melting the scrap glass in the lower portion of the scrap melter; and
   removing molten glass from the bottom of the scrap melter.

6. A process according to claim 1 or 5 including the steps of:
   melting and refining the glass batch including the molten scrap glass in the glass melting furnace; and
   transferring the molten glass to a fiberizing device and converting the molten glass into glass fibers by attenuating glass streams leaving the fiberizing device.

7. A process for recycling scrap glass including the steps of:
   feeding scrap glass to a scrap glass melting furnace;
   maintaining oxidizing conditions within the scrap furnace so as to burn-off organic binders or sizes;
   converting the scrap glass to a molten glass; and
   feeding the molten glass to a glass melting furnace which is also being fed granular raw glass batch, wherein the top of the scrap melter is maintained at 2200° F. and the bottom at 2500° F., thereby maintaining a temperature gradient therebetween.

* * * * *